(12) United States Patent
Kim et al.

(10) Patent No.: US 6,869,189 B2
(45) Date of Patent: Mar. 22, 2005

(54) ILLUMINATION OPTICAL UNIT EMPLOYING DICHROIC MIRROR WHEEL AND IMAGE DISPLAY SYSTEM INCLUDING THE ILLUMINATION OPTICAL UNIT

(75) Inventors: Sung-ha Kim, Gyeonggi-do (KR); Kun-ho Cho, Gyeonggi-do (KR); Dae-sik Kim, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 56 days.

(21) Appl. No.: 10/413,489

(22) Filed: Apr. 15, 2003

(65) Prior Publication Data

US 2003/0234913 A1 Dec. 25, 2003

(30) Foreign Application Priority Data

Jun. 25, 2002 (KR) .................. 10-2002-0035673

(51) Int. Cl.⁷ .................. G03B 21/00; G03B 21/14; G03B 21/28
(52) U.S. Cl. .................. 353/84; 353/31; 353/99
(58) Field of Search .................. 353/30–34, 37, 353/50, 51, 77, 78, 81, 84, 98, 99, 122, 38, 94; 349/5, 7–10, 4; 359/197, 212, 216, 225, 891, 892, 887, 890; 348/742, 743

(56) References Cited

U.S. PATENT DOCUMENTS

| | | | |
|---|---|---|---|
| 5,159,485 A | | 10/1992 | Nelson |
| 5,633,755 A | | 5/1997 | Manabe et al. |
| 6,020,940 A | * | 2/2000 | Ishikawa et al. ............ 349/8 |
| 6,219,111 B1 | * | 4/2001 | Fukuda et al. ............ 349/5 |
| 6,334,685 B1 | * | 1/2002 | Slobodin ............ 353/31 |
| 6,450,649 B2 | * | 9/2002 | De Vaan ............ 353/84 |
| 6,491,396 B2 | * | 12/2002 | Karasawa et al. ............ 353/20 |

FOREIGN PATENT DOCUMENTS

| | | |
|---|---|---|
| EP | 1024670 A2 | 8/2000 |
| EP | 1052856 A2 | 11/2000 |
| EP | 1280360 A2 | 1/2003 |
| JP | 2000-199928 | 7/2000 |
| WO | WO01/72049 A2 | 9/2001 |

* cited by examiner

*Primary Examiner*—Russell Adams
*Assistant Examiner*—Andrew Sever
(74) *Attorney, Agent, or Firm*—Staas & Halsey LLP

(57) ABSTRACT

An illumination optical unit and an image display system including the illumination optical unit. The illumination optical unit comprises a light source which emits light and a dichroic mirror wheel, which includes a plurality of dichroic mirrors, each of which is divided into at least three segments, to sort out at least three color light beams from light incident from the light source and to reflect the light beams as the mirror wheel is rotated by a motor. The image display system comprises the illumination optical unit; an image optical unit which modulates light incident from the illumination optical unit to form an image; and a projection optical unit which projects light from the image optical unit onto a screen. Since light is temporally and spatially divided, light loss is reduced and a high resolution of an image is accomplished.

25 Claims, 10 Drawing Sheets

ILLUMINATION OPTICAL UNIT EMPLOYING DICHROIC MIRROR WHEEL AND IMAGE DISPLAY SYSTEM INCLUDING THE ILLUMINATION OPTICAL UNIT

CROSS-REFERENCE TO RELATED APPLICATIONS

This application claims the priority of Korean Patent Application No. 2002-35673, filed Jun. 25, 2002, in the Korean Intellectual Property Office, the disclosure of which is incorporated herein by reference.

BACKGROUND OF THE INVENTION

1. Field of the Invention

The present invention relates to an illumination optical unit and an image display system having the same, and more particularly, to an illumination optical unit employing a dichroic mirror wheel and an image display system including the illumination optical unit.

2. Description of the Related Art

FIG. 1 is a diagram showing an example of a conventional single panel color image display system using a color wheel. Referring to FIG. 1, the conventional single panel color image display system comprises a light source 100; a focusing lens 102, which focuses light incident from the light source 100 on a color wheel 105, which sequentially sorts out colors from the focused light in response to different color image signals of the color display system; fly eye lenses 107 and 110, which uniformize the distribution of intensity of each color light beam sorted out by the color wheel 105; an image display device 112, which performs optical modulation on each color light beam in response to an applied image signal; and a projection lens 115, which projects the modulated light beams onto a screen 118.

In the conventional single panel color image display system, the color wheel 105 transmits only a color light beam corresponding to each color filter in order of red, green, and blue with respect to light incident from the light source, i.e., a lamp 100, while the color wheel is rotating. Consequently, ⅔ of the total quantity of light is lost, decreasing light efficiency.

FIG. 2 is a diagram showing an example of a conventional single panel color image display system using dichroic mirrors. FIG. 3 is a diagram showing optical paths in a micro lens array and a liquid crystal display (LCD) device, which are shown in FIG. 2. Referring to FIGS. 2 and 3, the conventional single panel color image display system using dichroic mirrors comprises an arc lamp, three dichroic mirrors 204R, 204G, and 204B, slanted with respect to one another, a polarization converter 205, a micro lens array 206, a field lens 208, a projection lens 209, and an image display device 211, comprising a micro lens array 206 and a liquid crystal layer 207.

The arc lamp comprises a lamp 202 which emits white light; an arc mirror 201 installed to surround one side of the lamp 202; and a condenser lens 203, which collects diverging light directly emitted from the lamp 202 and diverging light reflected from the arc mirror 201 and converts the collected diverging light into parallel light.

The white light emitted from the arc lamp is divided into a red (R) light beam, a green (G) light beam, and a blue (B) light beam by the three dichroic mirrors 204R, 204G, and 204B, respectively. The dichroic mirror 204R reflects the R light beam of the white light incident from the arc lamp and transmits the remaining color light beams. The dichroic mirror 204G reflects the G light beam of the color light beams transmitted by the dichroic mirror 204R and transmits the remaining color light beam, i.e., the B light beam. The dichroic mirror 204B reflects the B light beam.

The dichroic mirrors 204R, 204G, and 204B are disposed such that dichroic mirror 204G is slanted with respect to the dichroic mirror 204R at an angle of −θ and to the dichroic mirror 204B at an angle of +θ. Here, "+" indicates a counterclockwise direction, and "−" indicates a clockwise direction. Accordingly, the chief ray of the R light beam is incident on the micro lens array 206 at an angle of −θ with the chief ray of the G light beam, and the chief ray of the B light beam is incident on the micro lens array 206 at an angle of +θ with the chief ray of the G light beam.

In the micro lens array 206, a micro lens element 206a, comprising a plurality of cylindrical lenses, and a micro lens element 206b, comprising a plurality of cylindrical lenses, are arranged in a horizontal direction. The micro lens array 206 condenses the R light beam, the G light beam, and the B light beam, which are incident at different angles, on signal electrodes 207R, 207G, and 207B, respectively, of an image display device 211 in a striped pattern.

The image display device 211 has a structure in which the liquid crystal layer 207 is sandwiched between two transparent glass substrates 212 and 213. A transparent conductive film 214, the liquid crystal layer 207, and the signal electrodes 207R, 207G, and 207B, form a matrix structure.

In the conventional single panel color image display system having the above-described structure, the three dichroic mirrors 204R, 204G, and 204B divide white light incident from the arc lamp into an R light beam, a G light beam, and a B light beam, which are condensed on the signal electrodes 207R, 207G, and 207B, respectively, of the image display device 211. Taking into account a difference in the incident angle among the chief rays of the respective R, G, and B light beams, the signal electrodes 207R, 207G, and 207B are arranged at predetermined intervals in an horizontal direction. The signal electrodes 207R, 207G, and 207B are subpixels, which form a single image pixel.

Each unit micro lens of the micro lens elements 206a and 206b corresponds to three subpixels, which correspond to R, G, and B, respectively. The three subpixels are projected on a screen 210 through the field lens 208 and the projection lens 209 so that the three subpixels form a single image pixel. Accordingly, a viewer views an entire color image comprising these image pixels.

However, since three subpixels form a single image pixel in the above-described conventional single panel color image display system, the resolution of an LCD device decreases to ⅓. Accordingly, in order to realize the same resolution using, for example, projection type single panel image display systems using a color wheel, as disclosed in U.S. Pat. Nos. 5,633,755 and 5,159,485, the physical resolution of an LCD device must be increased three times. When the physical resolution of the LCD device is increased three times, aperture efficiency decreases, so optical efficiency decreases. In addition, yield in mass production decreases, thereby increasing manufacturing cost. Moreover, the size of the LCD device becomes too large because the physical resolution of the LCD device must be increased three times. When the size of the LCD device becomes large, the condenser lens, the field lens, or the projection lens must be large, thereby increasing manufacturing cost.

SUMMARY OF THE INVENTION

The present invention provides a light, thin, simple, and small illumination optical unit, which increases optical efficiency by spatially and temporally dividing light for illumination, and an inexpensive high-brightness and high-picture quality image display system having the same.

According to an aspect of the present invention, there is provided an illumination optical unit comprising a light source which emits light, and a dichroic mirror wheel comprising a plurality of dichroic mirrors, each of which is divided into at least three segments in order to sort out at least three color light beams from light incident from the light source and to reflect the light beams.

A number of dichroic mirrors may be the same as a number of the segments, and the light beams may include red, green, and blue light beams. Segments at corresponding positions in the plurality of dichroic mirrors may reflect different color light beams.

Where a horizontal deviation among focuses of the individual color light beams is represented by "a", and the perpendicular axis of the dichroic mirrors is slanted with respect to an optical axis at an angle θ, intervals "d" at which the dichroic mirrors are arranged may satisfy the following formula:

$$d = \frac{a}{2\sin\theta}.$$

Where the dichroic mirrors are arranged at intervals "d", and the perpendicular axis of the dichroic mirrors is slanted with respect to an optical axis at an angle θ, a vertical deviation "b" among focuses of the individual color light beams may satisfy the following formula:

$$b = \frac{d}{\cos\theta}.$$

The illumination optical unit may further comprise a mirror in the path of light reflected by the dichroic mirrors in order to remove the vertical deviation.

The illumination optical unit may further comprise an optical integrator in an optical path between the light source and the dichroic mirror wheel in order to uniformize the light.

The illumination optical unit may further comprise a collimating lens in an optical path between the optical integrator and the dichroic mirror wheel in order to convert the light into parallel light.

The illumination optical unit may further comprise a polarization converter in an optical path between the collimating lens and the dichroic mirror wheel in order to convert parallel light beams into a polarized beam.

The illumination optical unit may further comprise a focusing lens on an optical path between the polarization converter and the dichroic mirror wheel in order to focus the polarized beam on the dichroic mirror wheel.

According to another aspect of the present invention, there is provided an image display system comprising an illumination optical unit further comprising a light source which emits light, and a dichroic mirror wheel comprising of a plurality of dichroic mirrors, each of which is divided into at least three segments in order to sort out at least three color light beams from the light incident from the light source and reflect the light beams; an image optical unit which modulates light incident from the illumination optical unit to form an image; and a projection optical unit which projects light from the image optical unit onto a screen.

A number of dichroic mirrors may be the same as the number of segments, and the light beams may include red, green, and blue light beams. Segments at corresponding positions in the plurality of dichroic mirrors may reflect different color light beams.

Where a horizontal deviation among focuses of the individual color light beams is represented by "a", and the perpendicular axis of the dichroic mirrors slants to an optical axis at an angle θ, intervals "d" at which the dichroic mirrors are arranged may satisfy the following formula:

$$d = \frac{a}{2\sin\theta}.$$

Where the dichroic mirrors are arranged at intervals "d", and the perpendicular axis of the dichroic mirrors slants to an optical axis at an angle θ, a vertical deviation "b" among focuses of the individual color light beams may satisfy the following formula:

$$b = \frac{d}{\cos\theta}.$$

The image display system may further comprise a mirror in the path of light reflected by the dichroic mirrors in order to remove the vertical deviation.

The image display system may further comprise an optical integrator in an optical path between the light source and the dichroic mirror wheel in order to uniformize the light.

The image display system may further comprise a collimating lens in an optical path between the optical integrator and the dichroic mirror wheel in order to convert light beams into parallel light beams.

The image display system may further comprise a polarization converter in an optical path between the collimating lens and the dichroic mirror wheel in order to convert the parallel light beams into a polarized beam.

The image display system may further comprise a focusing lens in an optical path between the polarization converter and the dichroic mirror wheel in order to focus the polarized beam on the dichroic mirror wheel.

The image optical unit may further comprise a lens array condensing the at least three color light beams, which are sorted out and reflected by the dichroic mirror wheel, on different positions; and a panel which modulates the light incident from the lens array to form an image.

The projection optical unit may further comprise a projection lens which projects the image of the image optical unit onto the screen.

The image display system may further comprise a field lens in an optical path between the image optical unit and the projection optical unit in order to uniformize light emitted from the image optical unit.

The present invention provides an illumination optical unit using a dichroic mirror wheel temporally and spatially dividing light, thereby realizing a full color spectrum. Accordingly, optical loss occurring in a conventional single panel image display system using a color wheel is reduced, resulting in a three times higher resolution than that of a conventional color image display system using a stationary dichroic mirror.

BRIEF DESCRIPTION OF THE DRAWINGS

The above and/or other features and advantages of the present invention will become more apparent by describing in detail embodiments thereof with reference to the accompanying drawings in which.

DESCRIPTION OF THE PREFERRED EMBODIMENTS

Figure 4:
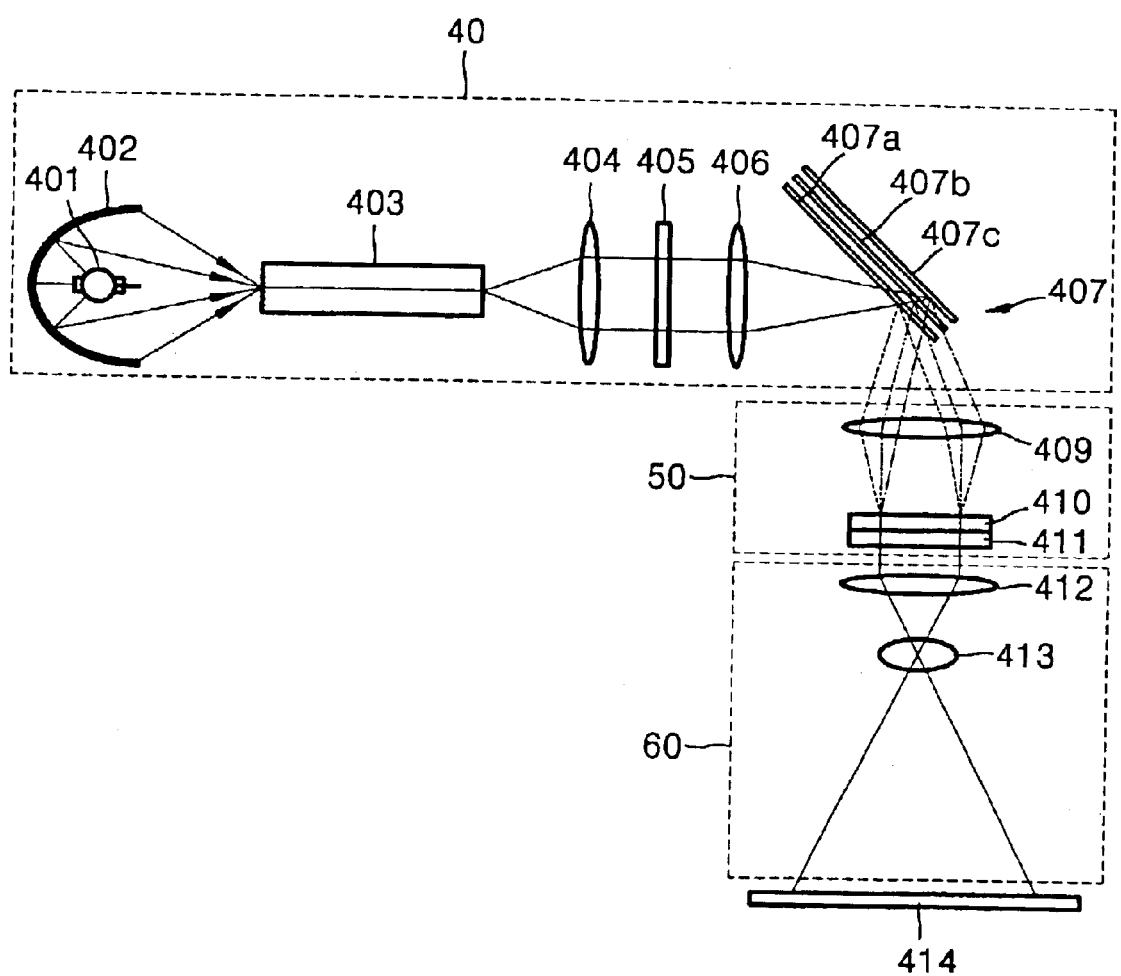
FIG. 4 is a diagram of an illumination optical unit according to a first embodiment of the present invention and an image display system having the same.

Referring to FIG. 4, an image display system according to a first embodiment of the present invention comprises an illumination optical unit 40 which divides and separately radiates light by wavelength bands, an image optical unit 50 which performs optical modulation on the light incident from the illumination optical unit 40 in response to an applied image signal in order to form an image, and a projection optical unit 60 which transmits light incident from the image optical unit 50 to a screen 414.

The illumination optical unit 40 comprises a lamp 401 which emits light, a reflective mirror 402 which condenses light diverging from the lamp 401, and a dichroic mirror wheel 407 comprising a plurality of dichroic mirrors 407a, 407b, and 407c, each of which is divided into at least three segments to divide the light incident from the lamp 401 into at least three color light beams and to reflect the light beams. The light beams may be three, in number and include a red (R) light beam, a green (G) light beam, and a blue (B) light beam. A number of dichroic mirrors may be the same as a number of segments of each dichroic mirror. For example, where each dichroic mirror is divided into three segments to divide the incident light into three colors, three dichroic mirrors are arranged, forming the dichroic mirror wheel 407. Where each dichroic mirror is divided into six segments to divide the incident light into six colors, six dichroic mirrors are arranged, forming the dichroic mirror wheel 407. The illumination optical unit 40 according to the first embodiment of the present invention comprises the first, second and third dichroic mirrors 407a, 407b, and 407c, as shown in FIG. 4, and each of the dichroic mirrors 407a, 407b, and 407c is divided into three segments.

The illumination optical unit 40 further comprises an optical integrator 403 which makes the intensity of the light emitted by the lamp 401 uniform and transmits the light. The illumination optical unit 40 further comprises a collimating lens 404 which collimates the light transmitted by the optical integrator 403, a polarization converter 405 which converts the light incident from the collimating lens 404 into polarized light, and a focusing lens 406 which focuses the polarized light on the dichroic mirror wheel 407.

Figure 7:
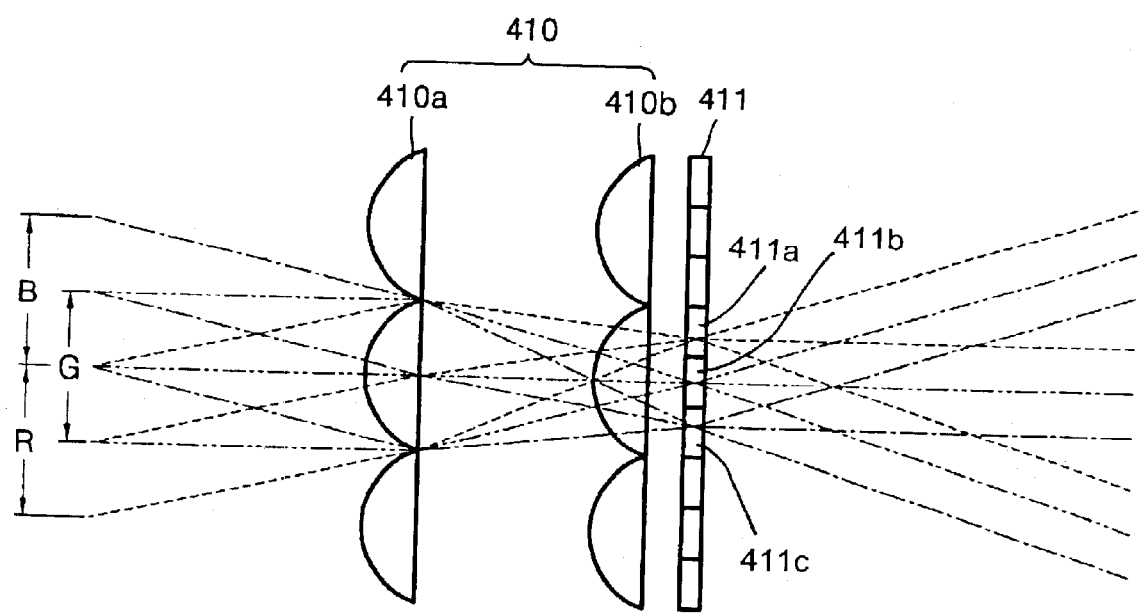
FIG. 7 is a diagram showing optical paths of individual color light beams passing through a micro lens array and reaching a panel in the image display system according to the first embodiment of the present invention.

The image optical unit 50 comprises a micro lens array 410 which condenses the R, G, and B light beams, which are divided and reflected by the dichroic mirror wheel 407, on different positions; and a panel 411 which modulates the light incident from the micro lens array 410 to form an image. A collimating lens 409 is provided on an optical path between the dichroic mirror wheel 407 and the micro lens array 410 to collimate each color light beam to be focused on the micro lens array 410. As shown in FIG. 7, the micro lens array 410 may further comprise a first micro lens array 410a and a second micro lens array 410b. The first micro lens array 410a is used as a field lens in order to reduce light loss.

Referring again to FIG. 4, the projection optical unit 60 comprises a projection lens 413 which projects light, which has been modulated according to image signals of the panel 411, onto the screen 414. The projection optical unit 60 further comprises a field lens 412 on an optical path between the panel 411 and the projection lens 413 to reduce a size of the projection lens 413. Light transmitted by the panel 411 is refracted by the field lens 412 to be collected on the projection lens 413.

Figure 5A:
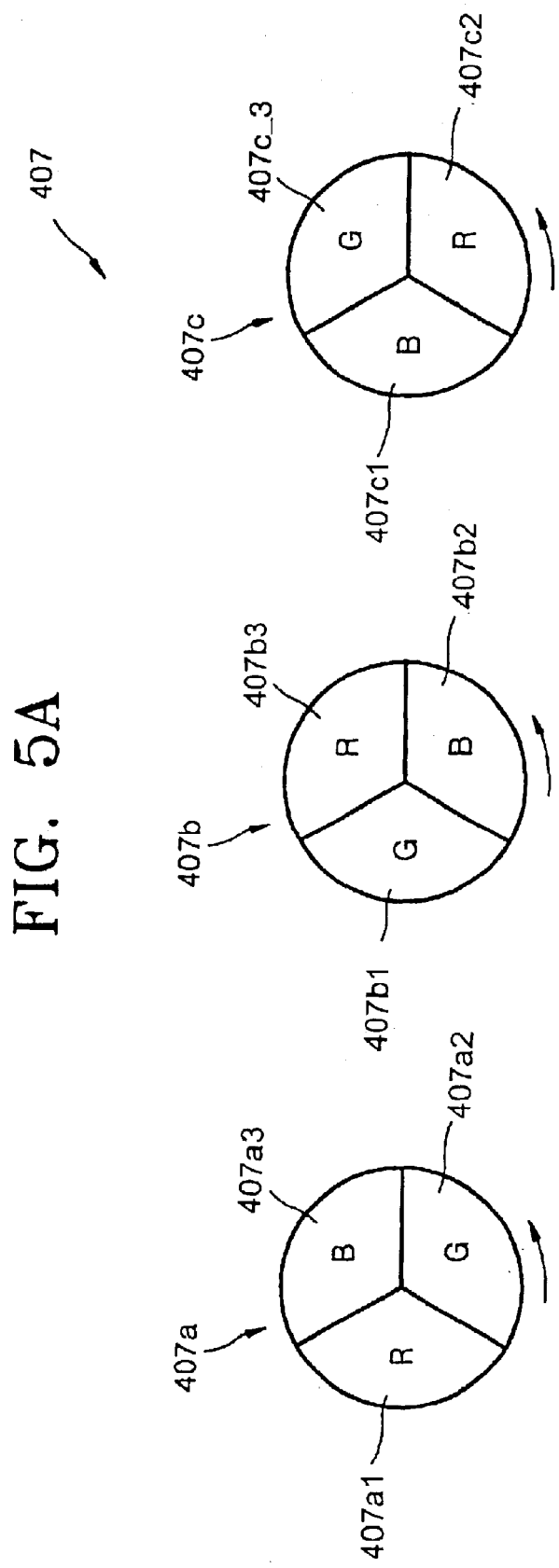
FIG. 5A shows plane views of individual mirrors of a dichroic mirror wheel provided in the illumination optical unit, according to the present invention.
Figure 5B:
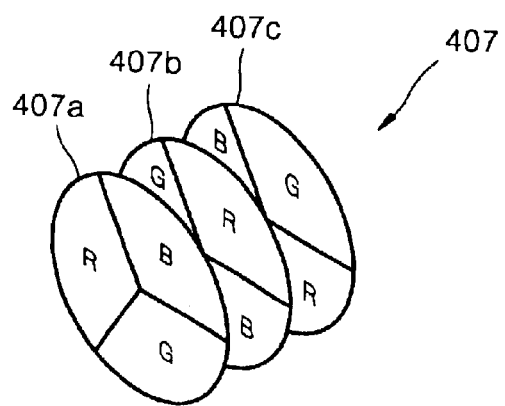
FIG. 5B is a perspective view of the dichroic mirror wheel provided in the illumination optical unit, according to the present invention.
Figure 11:
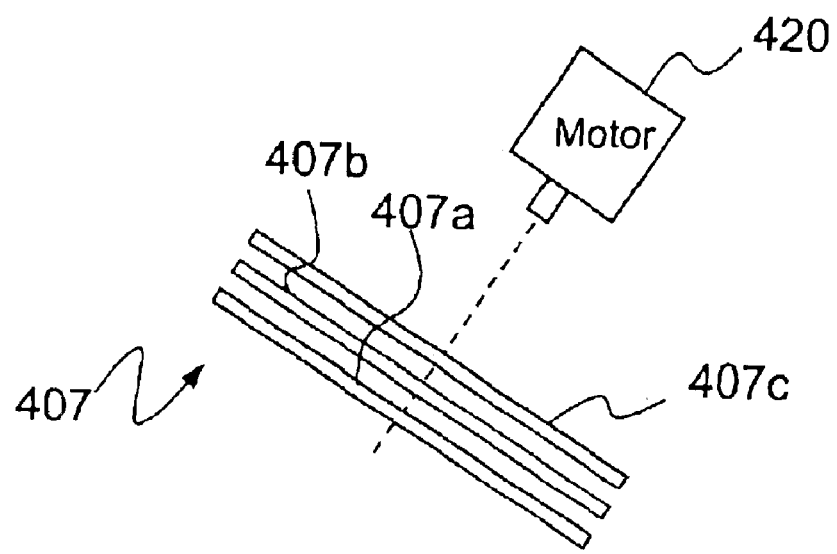
FIG. 11 illustrates a driving arrangement for the dichroic mirror wheel of the present invention.

In the embodiment shown in FIG. 4, the dichroic mirror wheel 407 shown in FIGS. 5A and 5B is rotated by a driving apparatus, such as, for example, a suitably coupled motor as shown in FIG. 11 so that different color light beams are incident on each pixel on the panel 411 shown in FIG. 7, thereby forming an image on the screen 414.

FIG. 5A shows plane views of the first, second and third dichroic mirrors 407a, 407b, and 407c of the dichroic mirror wheel 407 provided in the illumination optical unit 50 according to the first embodiment of the present invention. FIG. 5B is a perspective view of the dichroic mirror wheel 407.

Referring to FIG. 5A, the first dichroic mirror 407a is divided into first, second and third segments 407a1, 407a2, and 407a3 in order to sequentially sort out and reflect R, G, and B light beams. Similarly, the second dichroic mirror 407b is divided into first, second and third segments 407b1, 407b2, and 407b3 in order to sequentially sort out and reflect G, B, and R light beams. Similarly, the third dichroic mirror 407c is divided into first, second and third segments 407c1, 407c2, and 407c3 in order to sequentially sort out and reflect B, R, and G light beams.

Referring to FIG. 5B, the first, second and third dichroic mirrors 407a, 407b, and 407c are arranged such that the first segment 407b1 of the second dichroic mirror 407b and the first segment 407c1 of the third dichroic mirror 407c, which are disposed to correspond to a particular segment, for example, the first segment 407a1 reflecting an R light beam in the first dichroic mirror 407a, sort out and reflect a G light beam and a B light beam, respectively.

The first segment 407a1 of the first dichroic mirror 407a reflects only an R light beam and transmits G and B light beams. Then, the first segment 407b1 of the second dichroic mirror 407b reflects only the G light beam and transmits the B light beam. Then, the first segment 407c1 of the third dichroic mirror 407c reflects the B light beam. Such light division is simultaneously performed by the second and third segments 407a2, 407a3, 407b2, 407b3, 407c2, and 407c3 of the first, second and third dichroic mirrors 407a, 407b, and 407c, thereby spatially dividing light.

In other words, the second segment 407a2 of the first dichroic mirror 407a reflects only the G light beam and transmits the R and B light beams when the first segment 407a1 reflects only the R light beam. The second segment 407b2 of the second dichroic mirror 407b reflects only the B light beam among the R and B light beams transmitted by the second segment 407a2 of the first dichroic mirror 407a and transmits the R light beam. The second segment 407c2 of the third dichroic mirror 407c reflects the R light beam transmitted by the second segment 407b2 of the second dichroic mirror 407b.

Similarly, the third segment 407a3 of the first dichroic mirror 407a reflects only the B light beam and transmits the R and G light beams. The third segment 407b3 of the second dichroic mirror 407b, which is positioned to correspond to the third segment 407a3 of the first dichroic mirror 407a, reflects only the R light beam and transmits the G light beam. The third segment 407c3 of the third dichroic mirror 407c, which is positioned to correspond to the third segment 407b3 of the second dichroic mirror 407b, reflects the G light beam transmitted by the third segment 407b3 of the second dichroic mirror 407b.

As described above, the dichroic mirror wheel 407 spatially and temporally divides light into color light beams by being rotated by a motor, such as, for example, the motor 420 as shown in FIG. 11. When the dichroic mirror wheel 407 rotates counterclockwise, the first segment 407a1 of the first dichroic mirror 407a moves to a position of the second segment 407a2, and simultaneously the second segment 407a2 moves to the position of the third segment 407a3. Accordingly, in terms of space, only the R light beam is reflected at a predetermined position by the first segment 407a1 of the first dichroic mirror 407a during an initial ⅓ frame; only the B light beam is reflected at the predetermined position by the third segment 407a3, which is moved to the predetermined position by the rotation of the first dichroic mirror 407a, during the next ⅓ frame; and only the G light beam is reflected at the predetermined position by the second segment 407a2, which is moved to the predetermined position by the rotation of the first dichroic mirror 407a, during the last ⅓ frame.

Similarly, only the G light beam is reflected and the R and B light beams are transmitted at a predetermined position by the second segment 407a2 of the first dichroic mirror 407a during an initial ⅓ frame; only the R light beam is reflected and the G and B light beams are transmitted at the predetermined position by the first segment 407a1, which is moved to the predetermined position by the rotation of the first dichroic mirror 407a, during the next ⅓ frame; and only the B light beam is reflected and the R and G light beams are transmitted at the predetermined position by the third segment 407a3, which is moved to the predetermined position by the rotation of the first dichroic mirror 407a, during the last ⅓ frame.

The second dichroic mirror 407b reflects only the G light beam among the G and B light beams, which is transmitted by the first segment 407a1 of the first dichroic mirror 407, at the first segment 407b1 corresponding to the first segment 407a1 of the first dichroic mirror 407a. Since the second dichroic mirror 407b also rotates in the same direction and at the same speed with the first dichroic mirror 407a, when the first dichroic mirror 407a rotates counterclockwise, the second dichroic mirror 407b also rotates counterclockwise. Accordingly, a positional correspondence between the segments of the first and second dichroic mirrors 407a and 407b does not change.

After the third segment 407b3 of the second dichroic mirror 407b moves to a position where the first segment 407b1 was previously located, the third segment 407b3 of the second dichroic mirror 407b reflects only the R light beam among the R and B light beams transmitted by the third segment 407a3 of the first dichroic mirror 407a and transmits the B light beam to the third dichroic mirror 407c.

Like the second dichroic mirror 407b, the third dichroic mirror 407c also simultaneously rotates counterclockwise when the first and second dichroic mirrors 407a and 407b rotate counterclockwise. Accordingly, the third dichroic mirror 407c reflects the B light beam, which is transmitted by the first segment 407b1 of the second dichroic mirror 407b, at a predetermined position during the initial ⅓ frame, and then reflects the G light beam, which is transmitted by the third segment 407b3 of the second dichroic mirror 407b, at the predetermined position during the next ⅓ frame after rotating together with the first and second dichroic mirrors 407a and 407b.

Figure 10:
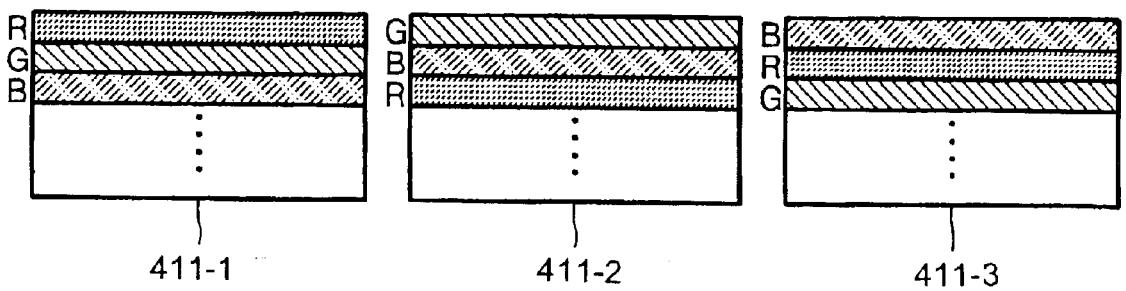
FIG. 10 is a diagram showing a pixel of a panel on which different color light beams are radiated in different orders due to the rotation of a dichroic mirror wheel in an illumination optical unit according to the embodiments of the present invention.

FIG. 10 is a diagram showing a pixel of the panel 411 on which different color light beams are radiated in different orders due to the rotation of the dichroic mirror wheel 407 shown in FIGS. 5A and 5B in an illumination optical unit according to the present invention.

Referring to FIG. 10, light beams reflected by the dichroic mirror wheel 407 rotating as shown in FIGS. 5A and 5B are incident on the panel 411 shown in FIG. 4. R, G, and B light beams reflected by the first segments 407a1, 407b1, and 407c1 of the respective first, second and third dichroic mirrors 407a, 407b, and 407c are sequentially incident on the panel 411 in a pattern 411-1, as many times as the number of vertical pixels divided by 3. When the second segments 407a2, 407b2, and 407c2 are located at positions where the first segments 407a1, 407b1, and 407c1 were located previously, due to the clockwise rotation of the dichroic mirror wheel 407 shown in FIGS. 5A and 5B, G, B, and R light beams are sequentially incident on vertical pixels of the panel 411 in a pattern 411-2. When the third segments 407a3, 407b3, and 407c3 are located at positions where the second segments 407a2, 407b2, and 407c2 were located previously, due to another clockwise rotation of the dichroic mirror wheel 407, B, R, and G light beams are sequentially incident on vertical pixels of the panel 411 in a pattern 411-3.

For example, when a frame speed is 60 Hz in an image display system according to the present invention, a full-color image is obtainable by rotating a dichroic mirror wheel including three dichroic mirrors, each of which is divided into three segments for R, G, and B light beams, respectively, at a speed three times faster than the frame speed, that is, a speed of 180 Hz. If the dichroic mirror wheel comprises six dichroic mirrors, each of which is divided into six segments, a full-color image is obtainable by rotating the dichroic mirror wheel at half of the rotating speed of the dichroic mirror wheel having three dichroic mirrors, that is, a speed of 90 Hz. As the number of dichroic mirrors and the number of segments in each dichroic mirror increase, the proper rotating speed of a dichroic mirror wheel for obtaining a full-color image decreases.

Individual segments located at the corresponding positions in the first, second and third dichroic mirrors 407a, 407b, and 407c of the dichroic mirror wheel 407 reflect different color light beams, respectively, so light is divided spatially. In addition, unlike a conventional color wheel, the first, second and third dichroic mirrors 407a, 407b, and 407c of the dichroic mirror wheel 407 of the present invention rotate, so light is temporally divided into wavelength bands. Accordingly, entire light is divided into three color light beams, thereby providing almost 100% light efficiency. In other words, the dichroic mirror wheel 407 used in an illumination optical unit according to the present invention divides light temporally and spatially, thereby effectively using light temporally and spatially.

Each of the dichroic mirrors of the dichroic mirror wheel 407 may be divided into at least three segments according to wavelength bands to be divided. For example, where light is divided into R, yellow (Y), G, and B light beams, the dichroic mirror wheel 407 may comprise four dichroic mirrors, and each dichroic mirror may be divided into four segments. Alternatively, where light is divided into R, G, and B light beams, each of the dichroic mirrors 407a, 407b, and 407c of the dichroic mirror wheel 407 may be divided into a number of segments which is evenly divisible by three, such as 3, 6, 9, etc., so that the light may be more finely divided temporally in order to increase resolution. In any case, dichroic mirrors are arranged such that corresponding segments in the individual dichroic mirrors reflect different color light beams.

Figure 6:
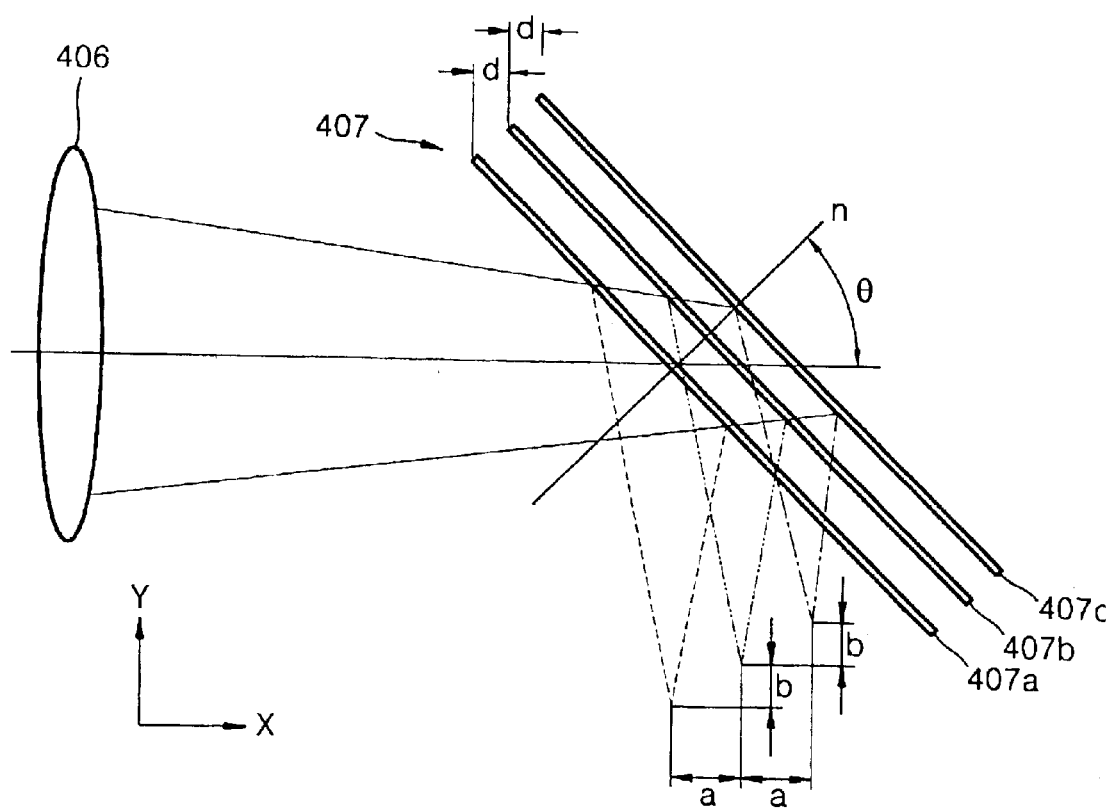
FIG. 6 is a conceptual diagram for explaining light division and reflection of the dichroic mirror wheel provided in the illumination optical unit, according to the present invention.

FIG. 6 is a conceptual diagram for explaining the light division and reflection of the dichroic mirror wheel 407. Referring to FIG. 6, the first, second and third dichroic mirrors 407a, 407b, and 407c, each of which is divided into three segments for R, G, and B light beams, are arranged at intervals of "d". An axis "n" perpendicular to the planes of the first, second and third dichroic mirrors 407a, 407b, and 407c is slanted with respect to an optical axis X at an angle θ. The first, second and third dichroic mirrors 407a, 407b, and 407c reflect different color light beams and focus the reflected different color light beams at different positions. Adjacent color light beams are displaced from each other by a deviation "a" in a horizontal direction parallel to the optical axis X and by a deviation "b" in a vertical direction orthogonal to the optical axis X. The deviation "a" is referred to as a horizontal deviation, and the deviation "b" is referred to as a vertical deviation.

FIG. 7 is a diagram showing representative optical paths of different color light beams passing through the micro lens array 410 and representative pixels on the panel 411. The different color light beams have different slopes depending on respective wavelength bands of the light beams, and the same color light beams are parallel to one another.

Referring to FIG. 7, different color light beams divided by the dichroic mirror wheel 407, as shown in FIG. 6, are refracted by a first micro lens array 410a and then refracted again by a second micro lens array 410b so that the same color light beam is focused on a single point, and the different color light beams are focused on different pixels. An R light beam passes through an upper pixel 411a. A G light beam passes through a middle pixel 411b. A B light beam passes through a lower pixel 411c.

For example, where a 0.9 inch (about 23 mm) liquid crystal display (LCD) micro device having a resolution of 1024*768 is used, it is assumed that a horizontal pixel pitch P is 0.018 mm and a pixel's fill factor F is 80%. In this case, an available aperture size (AS) of a pixel is 0.014 mm according to Equation (1).

$$AS = P \times F \quad \ldots (1)$$

In other words, light beams must be focused on the panel 411 shown in FIG. 7 at 0.018 mm intervals. When the diameter of the collimating lens 409 shown in FIG. 4 is 25 mm, the focal length $F_c$ of the collimating lens 409 is 30 mm, the diameter of a micro lens unit of the micro lens array 410 is three times longer than the pixel pitch P, i.e., 0.054 mm, and the focal length $F_m$ of the micro lens is 0.135 mm, the horizontal deviation "a" may be calculated as being 4 mm according to Equation (2).

$$a = P \times \frac{F_c}{F_m} \tag{2}$$

The Intervals "d", at which the first, second and third dichroic mirrors 407a, 407b, and 407c of the dichroic mirror wheel shown in FIG. 6 are arranged, may be calculated using the horizontal deviation "a". Where the angle θ is 45 degrees, the intervals "d" among the first, second and third dichroic mirrors 407a, 407b, and 407c may be calculated as being 2.83 mm according to Equation (3).

$$d = \frac{a}{2\sin\theta} \tag{3}$$

Where a diverging angle Φ of monochromatic parallel light incident on the micro lens array 410 is ±2, a beam size "w" at a point on each pixel on which light is focused in the panel 411 may be calculated as being 0.0047 mm according to Equation (4). Here, the calculated beam size "w" is less than the AS, i.e., 0.014 mm, of each pixel, so it is inferred that color light is focused on each pixel.

$$w = F_m \times \tan \Phi \tag{4}$$

The vertical deviation "b" shown in FIG. 6 may be obtained by applying the interval "d" among the dichroic mirrors 407a, 407b, and 407c and the angle θ between the perpendicular axis "n" and the optical axis X to Equation (5). Where the interval "d" is 2.83 mm obtained from Equation (3) and the angle θ is 45 degrees, the vertical deviation "b" is 8 mm.

$$b = \frac{d}{\cos\theta} \tag{5}$$

A horizontal scale factor M is calculated as 0.0045 from Equation (6) where the focal length $F_c$ of the collimating lens 409 is 30 mm and the focal length $F_m$ of the micro lens is 0.135 mm. A vertical scale factor is a square of the horizontal scale factor M, or about 0.00002. Accordingly, the vertical deviation "b" may be ignored for the above design conditions.

$$M = \frac{F_m}{F_c} = 0.0045 \tag{6}$$

Figure 8:
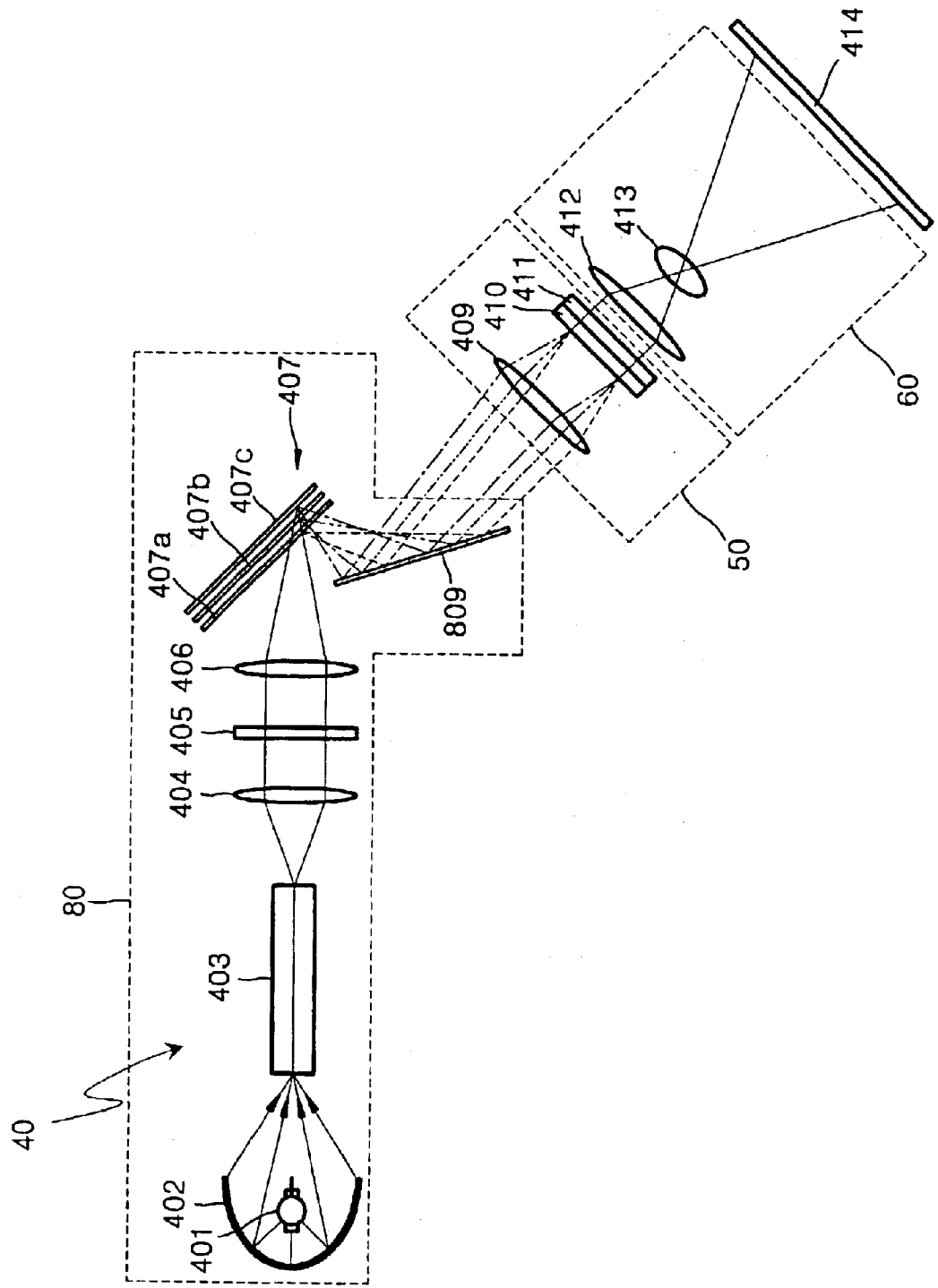
FIG. 8 is a diagram of an image display system including an illumination optical unit according to a second embodiment of the present invention.
Figure 9:
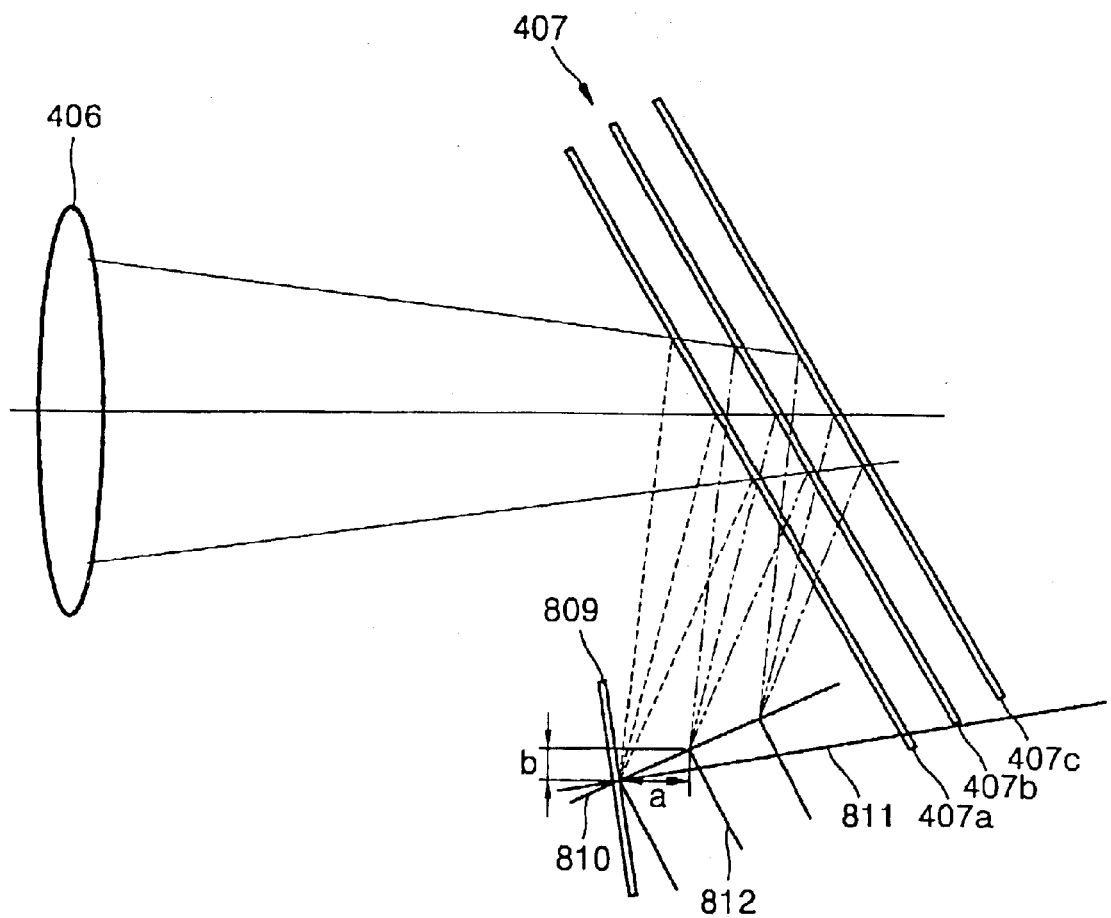
FIG. 9 is a diagram for explaining a method of removing a vertical deviation using a mirror shown in FIG. 8.

FIG. 8 is a diagram of an image display system according to a second embodiment of the present invention. The image display system according to the second embodiment comprises an illumination optical unit 80, the image optical unit 50, and the projection optical unit 60., The illumination optical unit 80 comprises the illumination optical unit 40 and a mirror 809 interposed between the dichroic mirror wheel 407 and the image optical unit 50. FIG. 9 is a diagram for explaining a method of removing the vertical deviation "b" using the mirror 809 shown in FIG. 8 where the design conditions are such that the deviation "b" cannot be ignored.

Referring to FIGS. 8 and 9, the mirror 809 is disposed between the dichroic mirror wheel 407 and the collimating lens 409 in order to reflect color light beams in a direction 812 perpendicular to a focus plane 810 on which the color light beams are focused so that the vertical deviation "b" among focused light beams occurring in the image display system having the illumination optical unit 40 shown in FIG. 4 according to the first embodiment of the present invention may be removed.

Referring to FIG. 9, light transmitted by the focusing lens 406 is divided into an R light beam, a G light beam, and a B light beam by the first, second and third dichroic mirrors 407a, 407b, and 407c and separately focused. Here, if the mirror 809 is disposed, as shown in FIG. 9, the color light beams are reflected by the mirror 809 in the direction 812 perpendicular to the focus plane 810 connecting the focuses of the color light beams so that the vertical deviation "b" is removed.

The functions of optical devices of the illumination optical unit 40, the image optical unit 50, and the projection optical unit 60, and the dichroic mirror wheel 407 in the image display system according to the second embodiment of the present invention are the same as in the image display system according to the first embodiment of the present invention.

Figure 1:
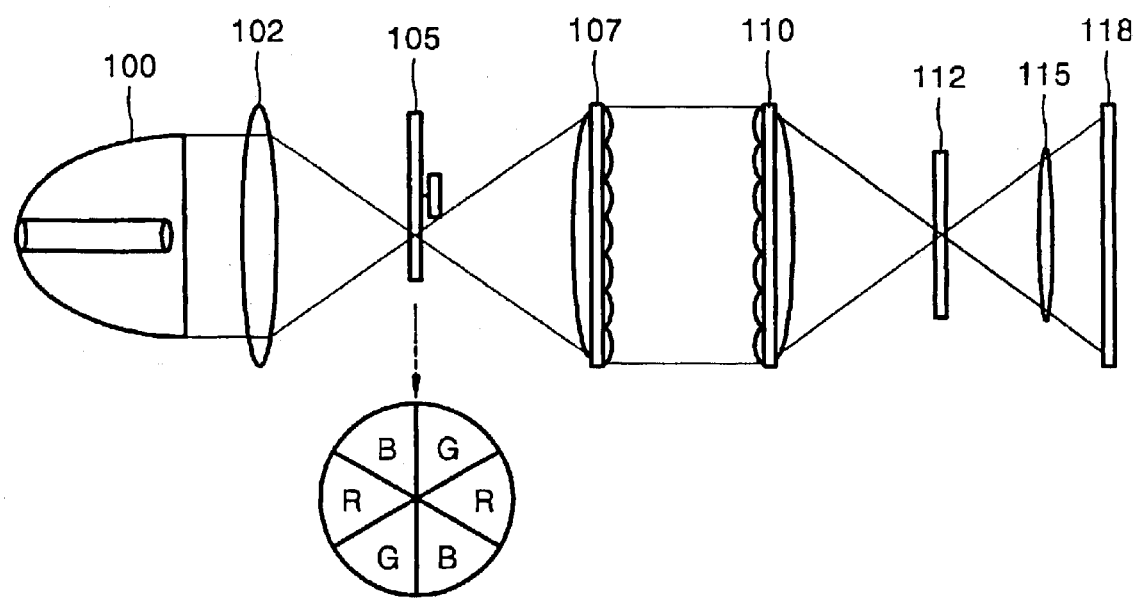
FIG. 1 is a diagram showing an example of a conventional single panel color image display system using a color wheel.
Figure 2:
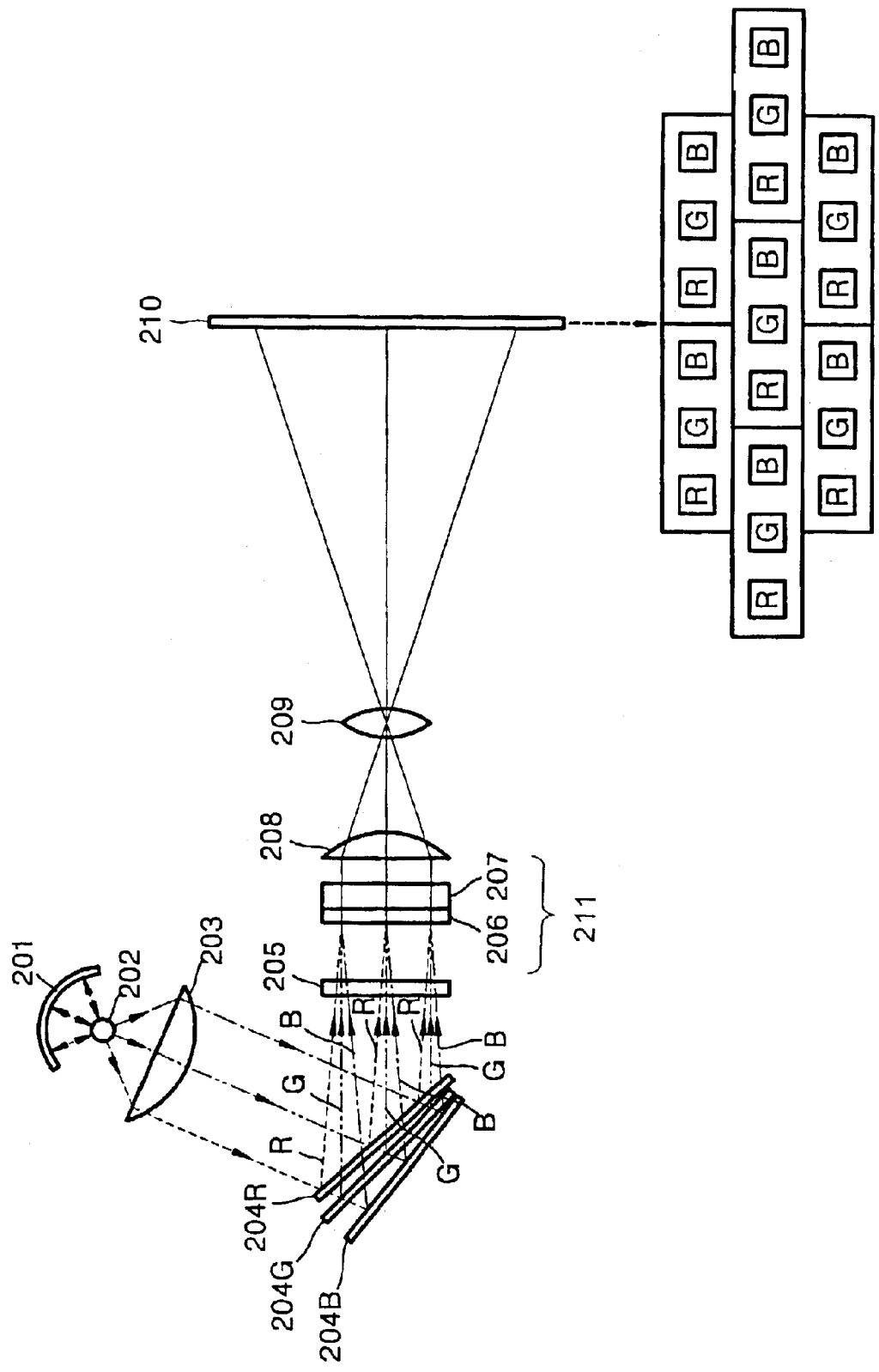
FIG. 2 is a diagram showing an example of a conventional single panel color image display system using dichroic mirrors.
Figure 3:
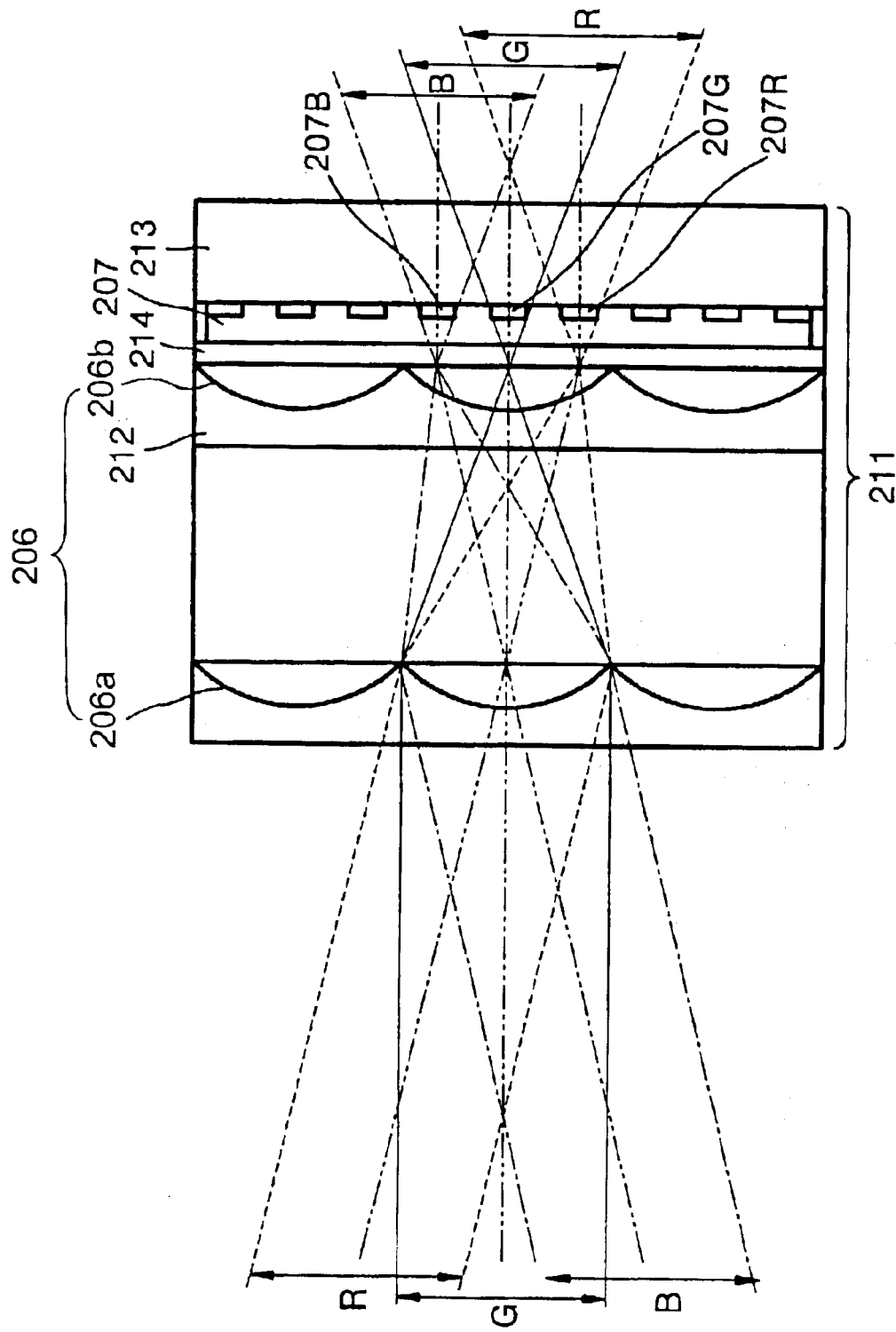
FIG. 3 is a diagram showing optical paths in a micro lens array and a liquid crystal display (LCD) device, which are shown in FIG. 2.

The vertical deviation "b" among different color light beams having different wavelengths is removable by disposing the first through third dichroic mirrors 407a, 407b, and 407c of the dichroic mirror wheel 407 such that the first and third dichroic mirrors 407a and 407c slant to the second dichroic mirror 407b at a predetermined angle like the dichroic mirrors 204R, 204G, and 204B of the convention color image display system shown in FIG. 2.

The present invention provides an illumination optical unit having a dichroic mirror wheel comprising a plurality of dichroic mirrors, each of which is divided into a plurality of segments reflecting only a predetermined color light beam and which transmits the remaining color light beams, and an image display system comprising the illumination optical unit. According to the present invention, light is temporally and spatially divided, thereby removing optical loss and realizing high resolution of an image.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An illumination optical unit comprising:
a light source which emits light;
a dichroic mirror wheel comprising a plurality of dichroic mirrors, each of which is divided into at least three segments in order to sort out at least three color light beams from light incident from the light source and reflect the light beams, the dichroic mirrors being spaced wart by a predetermined distance and arranged slanted at a predetermined angle with respect to an optical axis of light incident on the mirrors; and
a mirror in a path of light reflected by the dichroic mirrors which removes a deviation among focuses of the individual color light beams reflected by the dichroic mirrors.

2. The illumination optical unit of claim 1, wherein a number of the plurality of dichroic mirrors is equal to a number of the segments in each dichroic mirror.

3. The illumination optical unit of claim 1, wherein a number of the at least three color light beams is three and the three color light beams are red, green, and blue light beams.

4. The illumination optical unit of claim 1, wherein segments at corresponding positions in the plurality of dichroic mirrors reflect different color light beams.

5. The illumination optical unit comprising:
a light source which emits light; and
a dichroic mirror wheel comprising a plurality of dichroic mirrors, each of which is divided into at least three segments in order to sort out at least three color light beams from light incident from the light source and reflect the light beams,
wherein:
where a horizontal deviation among focuses of the individual color light beams is represented by "a", and a perpendicular axis of the dichroic mirrors is slanted at an angle θ with respect to an optical axis of light incident on the mirrors, intervals "d" at which the dichroic mirrors are arranged satisfies the following formula:

$$d = \frac{a}{2\sin\theta}.$$

6. An illumination optical unit comprising:
a light source which emits light; and
a dichroic mirror wheel comprising a plurality of dichroic mirrors, each of which is divided into at least three segments in order to sort out at least three color light beams from light incident from the light source and reflect the light beams,
wherein:
where the dichroic mirrors are arranged at intervals "d", and a perpendicular axis of the dichroic mirrors is slanted at an angle θ with respect to an optical axis of light incident on the dichroic mirrors, a vertical deviation "b" among focuses of the individual color light beams satisfies the following formula:

$$b = \frac{d}{\cos\theta}.$$

7. The illumination optical unit of claim 6, further comprising a mirror in a path of light reflected by the dichroic mirrors in order to remove the vertical deviation.

8. The illumination optical unit of claim 6, further comprising an optical integrator in an optical path between the light source and the dichroic mirror wheel in order to uniformize the light.

9. The illumination optical unit of claim 8, further comprising a collimating lens in an optical path between the optical integrator and the dichroic mirror wheel in order to convert the light into parallel light.

10. The illumination optical unit of claim 9, further comprising a polarization converter in an optical path between the collimating lens and the dichroic mirror wheel in order to convert parallel light beams into a polarized beam.

11. The illumination optical unit of claim 10, further comprising a focusing lens on an optical path between the polarization converter and the dichroic mirror wheel in order to focus the polarized beam on the dichroic mirror wheel.

12. An image display system, comprising:
an illumination optical unit comprising:
a light source which emits light, and
a dichroic mirror wheel comprising a plurality of dichroic mirrors, each of which is divided into at least three segments in order to sort out at least three color light beams from the emitted light and to reflect the sorted light beams, the dichroic mirrors being spaced apart by a predetermined distance and arranged slanted at a predetermined angle with respect to an optical axis of light incident on the mirrors;
a mirror in a path of light reflected by the dichroic mirrors which removes a deviation among focuses of the individual color light beams reflected by the dichroic mirrors;
an image optical unit which modulates the sorted and reflected light beams to form an image; and
a projection optical unit which projects the image onto a screen.

13. The image display system of claim 12, wherein a number of the plurality of dichroic mirrors is equal to a number of the segments in each dichroic mirror.

14. The image display system of claim 12, wherein a number of the at least three light beams is three and the three color light beams are red, green, and blue light beams.

15. The image display system of claim 12, wherein segments at corresponding positions in the plurality of dichroic mirrors reflect different color light beams.

16. An image display system, comprising:
an illumination optical unit comprising:
a light source which emits light, and
a dichroic mirror wheel comprising a plurality of dichroic mirrors, each of which is divided into at least three segments in order to sort out at least three color light beams from the emitted light and to reflect the sorted light beams;
an image optical unit which modulates the sorted and reflected light beams to form an image; and
a projection optical unit which projects the image onto a screen,
wherein:
where a horizontal deviation among focuses of the individual color light beams is represented by "a", and a perpendicular axis of the dichroic mirrors slants at an angle θ with respect to an optical axis of light incident on the dichroic mirrors, intervals "d" at which the dichroic mirrors are arranged satisfy the following formula:

$$d = \frac{a}{2\sin\theta}.$$

17. An image display system, comprising:
an illumination optical unit comprising:
a light source which emits light, and
a dichroic mirror wheel comprising a plurality of dichroic mirrors, each of which is divided into at least three segments in order to sort out at least three color light beams from the emitted light and to reflect the sorted light beams:
an image optical unit which modulates the sorted and reflected light beams to form an image; and
a projection optical unit which projects the image onto a screen,
wherein:
where the dichroic mirrors are arranged at intervals "d", and a perpendicular axis of the dichroic mirrors slants at an angle θ with respect to an optical axis of light incident on the dichroic mirrors, a vertical deviation "b" among focuses of the individual color light beams satisfies the following formula:

$$b = \frac{d}{\cos\theta}.$$

18. The image display system of claim 17, further comprising a mirror in a path of light reflected by the dichroic mirrors in order to remove the vertical deviation.

19. The image display system of claim 17, further comprising an optical integrator in an optical path between the light source and the dichroic mirror wheel in order to uniformize the light.

20. The image display system of claim 19, further comprising a collimating lens in an optical path between the optical integrator and the dichroic mirror wheel in order to convert the emitted light into parallel light beams.

21. The image display system of claim 20, further comprising a polarization converter in an optical path between the collimating lens and the dichroic mirror wheel in order to convert the parallel light beams into a polarized beam.

22. The image display system of claim 21, further comprising a focusing lens in an optical path between the polarization converter and the dichroic mirror wheel in order to focus the polarized beam on the dichroic mirror wheel.

23. The image display system of claim 17, wherein the image optical unit comprises:
a lens array which condenses the at least three color light beams, which are sorted out and reflected by the dichroic mirror wheel, on different positions; and
a panel which modulates the light incident from the lens array to form the image.

24. The image display system of claim 17, wherein the projection optical unit comprises a projection lens which projects the image onto the screen.

25. The image display system of claim 24, further comprising a field lens in an optical path between the image optical unit and the projection optical unit in order to uniformize the image.

* * * * *

UNITED STATES PATENT AND TRADEMARK OFFICE
CERTIFICATE OF CORRECTION

PATENT NO. : 6,869,189 B2
DATED : March 22, 2005
INVENTOR(S) : Sung-ha Kim et al.

It is certified that error appears in the above-identified patent and that said Letters Patent is hereby corrected as shown below:

Column 11,
Line 62, change "wart" to -- apart --.

Column 12,
Line 10, change "The" to -- An --.

Column 14,
Line 5, change ":" to -- ; --.

Signed and Sealed this

Third Day of January, 2006

JON W. DUDAS
*Director of the United States Patent and Trademark Office*